United States Patent [19]
Francisco et al.

[11] Patent Number: 6,030,490
[45] Date of Patent: Feb. 29, 2000

[54] APPARATUS FOR RADIO-FREQUENCY BONDING OF THERMOPLASTIC MEMBERS

[75] Inventors: Harry Bernard Francisco, Wilmington; Ronald Jack Riegert, Newark, both of Del.

[73] Assignee: E.I. du Pont de Nemours and Company, Wilmington, Del.

[21] Appl. No.: 09/119,793

[22] Filed: Jul. 21, 1998

Related U.S. Application Data

[63] Continuation-in-part of application No. 08/761,906, Dec. 9, 1996.

[51] Int. Cl.[7] .............................. H05B 6/54; B32B 31/00
[52] U.S. Cl. .................................. 156/380.8; 156/274.4; 156/435; 219/765; 219/780
[58] Field of Search .............................. 156/274.4, 380.8, 156/380.6, 72, 435; 219/780, 770, 765

[56] References Cited

U.S. PATENT DOCUMENTS 2,711,828  9/1949  Webb et al. .

*Primary Examiner*—Sam Chuan Yao

[57] ABSTRACT

A bonding apparatus for bonding a thermoplastic pad having a predetermined peripheral shape to a first surface of a carpet using radio frequency energy includes a die electrode and a backing electrode. Both the die electrode and the backing electrode have a peripheral shape that corresponds to the peripheral shape of the pad. In addition, both the die electrode and the backing electrode may have a relief feature thereon that are correspondingly sized and located. Concentrations of electric field intensity in the vicinity of the peripheral edge of the die electrode and along the edges of the relief feature on the die electrode are minimized so that bonding of a pad to a carpet may be effected without thermal runaway. The pad is bonded to the carpet without the occurrence of localized burning of the carpet pile or perforation of the pad.

14 Claims, 10 Drawing Sheets

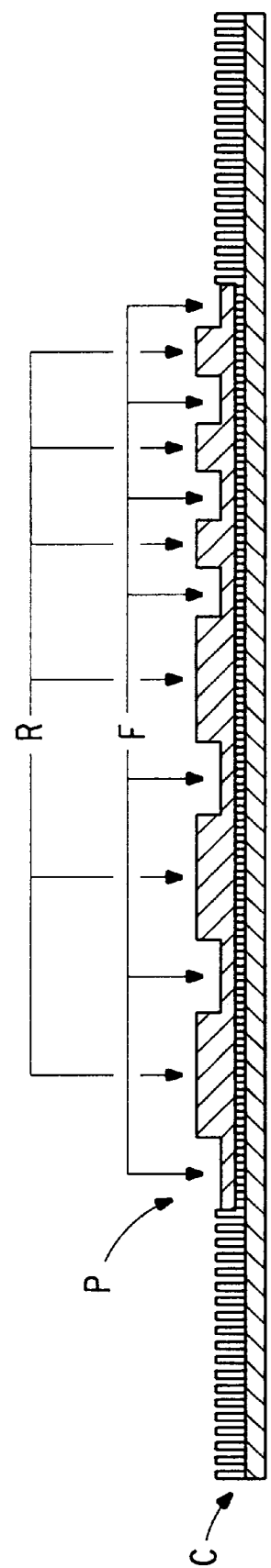

--- PRIOR ART
— CONJUGATE ELECTRODE

APPARATUS FOR RADIO-FREQUENCY BONDING OF THERMOPLASTIC MEMBERS

CROSS-REFERENCE TO RELATED APPLICATION

This application is a continuation-in-part of application Ser. No. 08/761,906, filed Dec. 9, 1996 (RD-7225), assigned to the assignee of the present invention.

BACKGROUND OF THE INVENTION

1. Field of the Invention

The present invention relates to an apparatus for directly bonding thermoplastic members, such as a thermoplastic pad to a pile carpet, using radio-frequency electromagnetic energy (RF energy).

2. Description of the Prior Art

The presence of wear-resistant pads on carpeted floor areas of an automobile interior is familiar to all drivers. In most cases such pads are fabricated of a thermoplastic sheet material having a predetermined peripheral shape. Typically, the pad is fabricated from a sheet of vinyl, such as polyvinyl chloride. The thermoplastic pad is either adhesively or directly bonded to the carpet. In typical adhesive bonding a thermoplastic adhesive is applied between the pad and the carpet, and radio-frequency electromagnetic energy (RF energy) or heat is used to melt the adhesive and effect the bond between the pad and the carpet. In an adhesive bonding situation overheating or burning is not usually a problem because the melting point of the thermoplastic adhesive is sufficiently lower than that of the materials of the carpet pile or pad. In direct bonding RF energy is applied to the pad and to the carpet to effect the bond therebetween. Direct bonding using RF energy is also known as "dielectric bonding". Such direct bonding of the pad to the carpet is preferred since no adhesive is required and since the bonding cycle time is reduced.

However, as will be fully explained herein, in some instances, especially in production environments, direct bonding of a pad to a carpet is difficult to achieve without overheating or discoloring of the carpet pile. This overheating or discoloring occurs due to increased field intensities caused by edge effects associated with the geometry of the electrodes of the bonding apparatus. The overheating or discoloring is exacerbated by the particular temperature dependence of the susceptibility of the carpet material to radio frequency energy. The term "susceptibility" as used herein means the ability of a material to convert electric field intensity to heat.

A direct bonding apparatus generally indicated by reference character 10 that is used in the prior art for applying RF energy to effect a bond between a first thermoplastic member, such as a thermoplastic pad P, to a first surface of a second thermoplastic member, such as a thermoplastic carpet C, is shown in FIGS. 1A and 1B. A finished automotive carpet C having the pad P bonded thereto is shown in FIGS. 2A and 2B. As suggested in FIG. 2A the pad P has a predetermined peripheral shape depending upon the region of the automobile interior on which it is disposed. The pad P has a embossed pattern formed therein. The pattern has a flat peripheral border region B surrounding a plurality of raised areas (R) with flat regions (F) therebetween.

The bonding apparatus 10 includes a first, die, electrode 14 and a second, backing, electrode 22. The electrodes 14, 22 are confrontationally arranged with respect to each other. The die electrode 14 includes a generally planar mounting portion 16 to which is attached a configured die member 18. Both the die electrode 14 (formed of mounting portion 16 and die member 18) as well as the backing electrode 22 are fabricated from an electrically conductive material, such as metal or a conductive composite.

The die member 18 has a predetermined height dimension 18H and has a peripheral shape that corresponds to the peripheral shape of the pad P to be bonded in the apparatus 10. In addition, the operative surface of the die member 18 has one or more relief features 18F, the edges of which are defined by depressions 18D. The relief features 18F of the die member 18 correspond to the border region B and the flat regions F on the pad P, while the depressions 18D on the die member 18 correspond to the raised areas R on the pad P. The width dimensions of the depressions 18D (such as dimensions 18W1, 18W2) and the depth dimension of the depressions 18D (such as the dimension 18E) and thus, the width and height dimensions of the raised areas R, are dictated in accordance with the design of the pattern to be imparted into the pad P. Typically, the depth dimension 18E is on the order of several millimeters.

In the prior art apparatus 10 the backing electrode 22 is generally planar. The electrodes 14, 22 are mounted within a framework 28 of a press 26 (FIG. 1A). Although the electrodes are shown as horizontally arranged with the die electrode 14 being located beneath the bonding electrode 22, it should be understood throughout this application that any convenient orientation of the electrodes 14, 22 with respect to the framework 28 and to each other may be used. The press 26 includes an actuator 30 operable to move the electrodes 14, 22 relative to each other (as suggested by the directional arrow 34) from an open position (shown FIG. 1A) to a closed position (suggested in FIG. 1C). Both electrodes 14, 22 are electrically connected to a suitable source 36 of high voltage RF energy. Typically, the source 36 outputs a radio frequency signal in the range from about one megahertz (1 MHz.) to one-hundred megahertz (100 MHz.) at a voltage in the range from about three thousand volts (3 kV) to about ten thousand volts (10 kV). Typical power levels of radio frequency bonding apparatus is in the range of five kilowatts (5 kW) to one hundred kilowatts (100 kW).

To bond a pad P to the carpet C the pad P is placed on the configured die member 18 of the die electrode 14, as is seen in FIG. 1A. The carpet C is thereafter placed with its pile surface S in contact with the undersurface of the pad P. The surface of the backing B of the carpet C is presented toward the backing electrode 22. A resilient buffer layer 38, typically fabricated of a material (such as silicone rubber) having a low susceptibility to RF energy, is interposed between the surface of the backing B of the carpet C and the backing electrode 22.

After the materials have been layered into their relative positions as described and illustrated in FIG. 1A a bonding cycle is initiated. The actuator 30 is asserted to move the backing electrode 22 toward the die electrode 14 to clamp the layered materials with a predetermined clamping pressure. Clamping pressure is usually specified in terms of the resulting gap G (FIG. 1C) defined between the raised area 18F of the die electrode 14 and the backing electrode 22. In practice the gap G is limited by a physical stop (not shown) in the press mechanism.

With the materials clamped the source 36 is activated and RF energy is applied between the electrodes 14, 22 to the layered materials clamped therebetween. The RF energy is applied at a predetermined voltage (typically, on the order of three thousand to ten thousand volts) for a predetermined period of time, termed the "heat cycle" (typically, on the order of five to twenty seconds), to heat the materials of the pad P and the pile S of the carpet C. The source 36 is deactivated and the materials remain clamped for a second predetermined period of time, termed the "soak cycle" (typically, also on the order of five to twenty seconds) to permit the materials that were heated to cool and the bond between them to set. In a satisfactory bond the material of the pad P is adhered over the entire interfacial area of the border region B and the flat regions F between the pad P and the carpet C, that is, the pad is "fully adhered". Also, in a satisfactory bond, the fully adhered condition is achieved without discoloring or melt-through of the pad P or discoloring or excessive melting of the carpet pile S adjacent to the periphery of the pad P. The range of combinations of voltages and times able to produce a fully adhered pad is termed the "operating window".

It has been found that, especially in a production environment, a conventional bonding apparatus is not able to produce a satisfactory bond between a pad and a carpet when the pile of the carpet is producer-colored nylon having a topical stain-resist material. No matter what voltage and time parameters are chosen for the operating window either (1) the pad P is not fully adhered to the carpet C, (2) discoloring or perforations occur in the pad P adjacent to the corners or edges of the raised areas R, and/or (3) discoloring or melting of the carpet C occurs adjacent to the periphery of the pad P. The inability to achieve a satisfactory bond is believed due the combination of (1) localized increases in electric field intensity due to edge effects resulting from the geometry of the coupled electrodes of the bonding apparatus, (2) the temperature-dependent RF susceptibility characteristic of the material of the carpet, and (3) the RF susceptibility and thermal conductivity characteristics of the carpet backing.

FIG. 1C illustrates the electric field lines (shown as fine lines) between the die electrode and backing electrode in the portion of FIG. 1A enclosed by the dashed box labeled "1C". For clarity of illustration the materials to be bonded that lie within the gap G are not shown. Relatively sharp-edged features are defined along the periphery of the die member 18 as well as along the relief features 18F thereof. The peripheral edges and the relief feature edges, together with the backing electrode 22, produce an electric field pattern in which field lines tend to converge in the vicinity of the edges. The spacing of adjacent field lines in FIG. 1C indicates the field intensity.

FIG. 4 shows a quantitative plot of the square of the field intensity (normalized) versus the relative lateral position of the field lines of FIG. 1C. The abscissa of the plot is relative lateral position, while the ordinate of the plot is the square of the field intensity (normalized to the field intensity between the central region of a relief feature 18F and the backing electrode 22). The plot is taken along a reference line 4—4 that lies a distance above the die member 18 equal to about ten percent of the width of the gap G between the electrodes 18, 22. The reference line 4—4 is selected to approximate the position at which the bond between the pad P and the carpet C occurs. The prior art field intensity is indicated by a dashed line carrying the reference label "Prior Art".

In automotive applications the pile surface S of the carpet C is usually formed from a thermoplastic polymeric material, typically a polyamide such as nylon. Nylon is the preferred due to its wear characteristics. However, nylon (and especially nylon 6,6) differs from other polymeric materials such as polyester and polypropylene used for carpets because the susceptibility of nylon to radio frequency energy increases with increasing temperature. A material having such a temperature dependent susceptibility characteristic is subject to a phenomenon known as "thermal runaway". In a thermal runaway situation the material of the carpet melts so that individual tufts lose their definition. Discoloration may also occur. The pile surface S of the carpet thus takes on an amorphous crusty appearance. The peak in the field intensity associated with a peripheral edge of the die electrode is indicated at reference character 40 in FIG. 4. The peak in the field intensity associated with a relief feature edge of the die electrode is indicated at reference character 42 in FIG. 4. These peak intensities, coupled with the particular temperature-dependent susceptibility characteristic of the nylon, results in a localized overheating which causes thermal runaway in the vicinity of the edges on the die member 18. Discoloration and an amorphous crusty appearance may be manifested adjacent to the periphery of the pad P. Perforations of the pad may occur in interior regions of the pad P due to the combination of thermal runaway of the carpet pile material and RF heating of the pad itself. These perforations usually occur at edges, and especially at corners, of relief features. Depending upon the material used the backing of the carpet may also contribute to the overall overheating problem.

The presence of additives such as colored pigments and/or topical stain-resist materials further increases the temperature dependence of the susceptibility of nylon to radio frequency energy and exacerbates the thermal runaway problem. It is believed that the further increase in temperature dependence is due to the mobility of the ions in the topical stain-resist material.

In view of the foregoing it is believed to be advantageous to provide a bonding apparatus that minimizes the problems of localized excessive heating when bonding a first thermoplastic member to a second thermoplastic member. More particularly, it is believed to be advantageous to provide a bonding apparatus that minimizes the problem of thermal runaway when bonding a thermoplastic pad to a nylon pile carpet.

SUMMARY OF THE INVENTION

The present invention is directed to a radio frequency bonding apparatus for bonding a first thermoplastic member, such as a thermoplastic pad, having a predetermined peripheral shape, to a second thermoplastic member, such as the pile surface of a carpet, thereby to form an embossed pattern having a peripheral border region (B) surrounding a plurality of raised areas (R) with flat regions (F) therebetween. The pile surface of the carpet is a made of a thermoplastic polymeric material susceptible to thermal runaway.

The bonding apparatus includes a first, die, electrode and a second, backing, electrode. The die electrode has a height dimension and a peripheral shape with edges and relief features. Each relief feature has an operative face thereon. The operative face of the relief feature has a first depth dimension. The peripheral shape of the die member corresponds to the peripheral shape of the first thermoplastic member, while the relief features correspond to the peripheral border region (B) and the flat regions (F) of the embossed pattern.

In accordance with the present invention the backing electrode has a conjugate bonding member thereon. The conjugate bonding member has a height dimension and has a peripheral shape that corresponds to the peripheral shape of the die member. The conjugate bonding member also has relief feature(s) sized and located to correspond to the size and location of the relief feature(s) on the die electrode. The relief features of the conjugate bonding member have a second depth dimension. The sum of the height dimensions of the die member and the conjugate bonding member is at least three (3) centimeters, while the ratio of the second depth dimension to the first depth dimension is at least five to one.

Thus, concentrations of electric field intensity in the vicinity of the peripheral edges of the die electrode and in the vicinity of the edges of the relief features are minimized so that bonding of a pad to a carpet may be effected without thermal runaway. The pad is fully bonded to a carpet in the peripheral border region (B) and the flat regions (F) without the occurrence of localized overheating of either the pad or the carpet pile or perforation of the pad.

BRIEF DESCRIPTION OF THE DRAWING

The invention will be more fully understood from the following detailed description, taken in connection with the accompanying drawing, in which:

FIG. 1A is a side-elevational view in section of a bonding apparatus of the prior art, while

FIG. 2A is a perspective view of a pad bonded to the carpet using the bonding apparatus of FIGS. 1A and 1B and of FIGS. 3A and 3B, while FIG. 2B is a sectional view taken along section lines 2B—2B in FIG. 2A;

DETAILED DESCRIPTION OF THE INVENTION

Figure 1A:
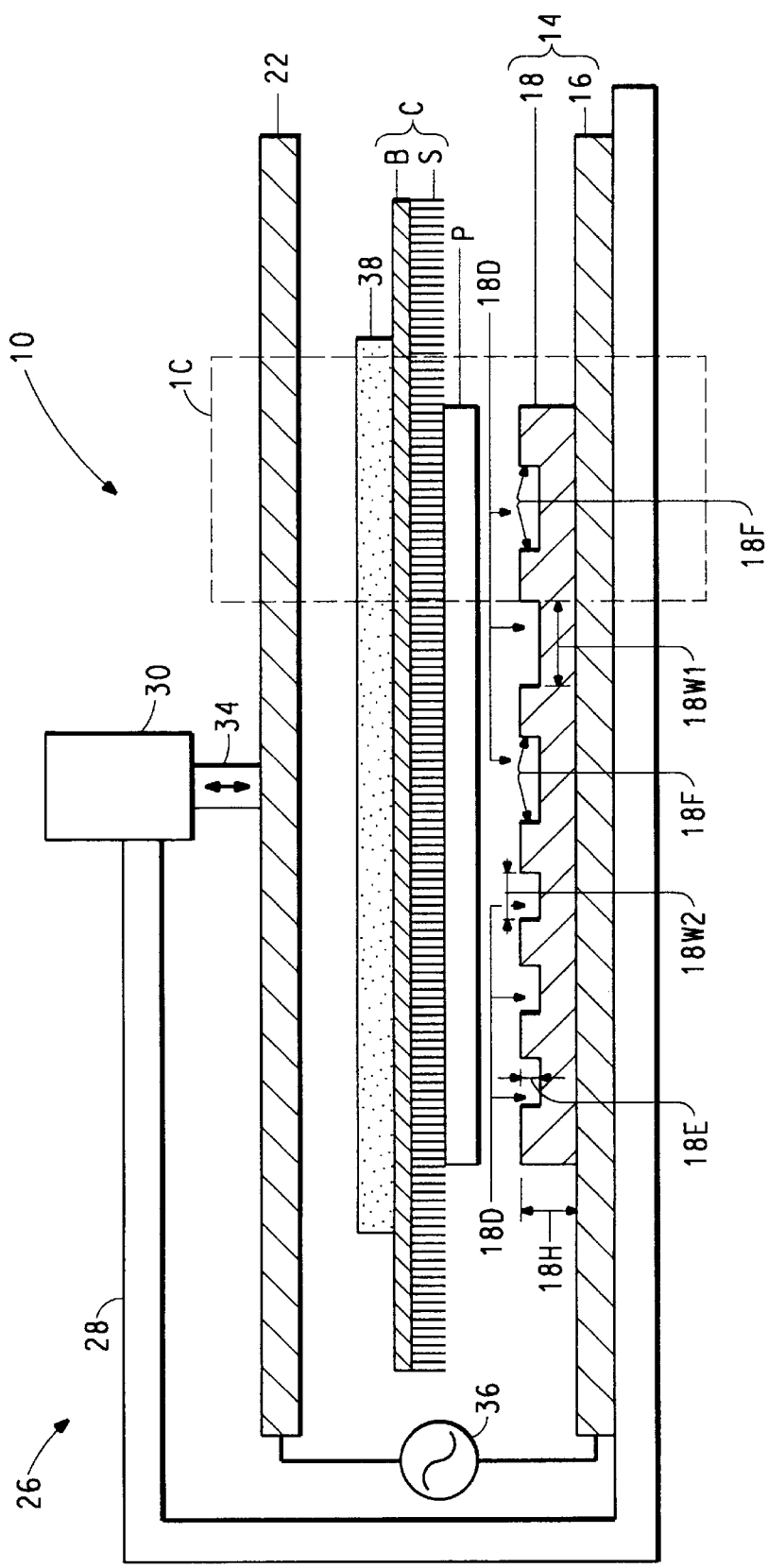
Figure 1B:
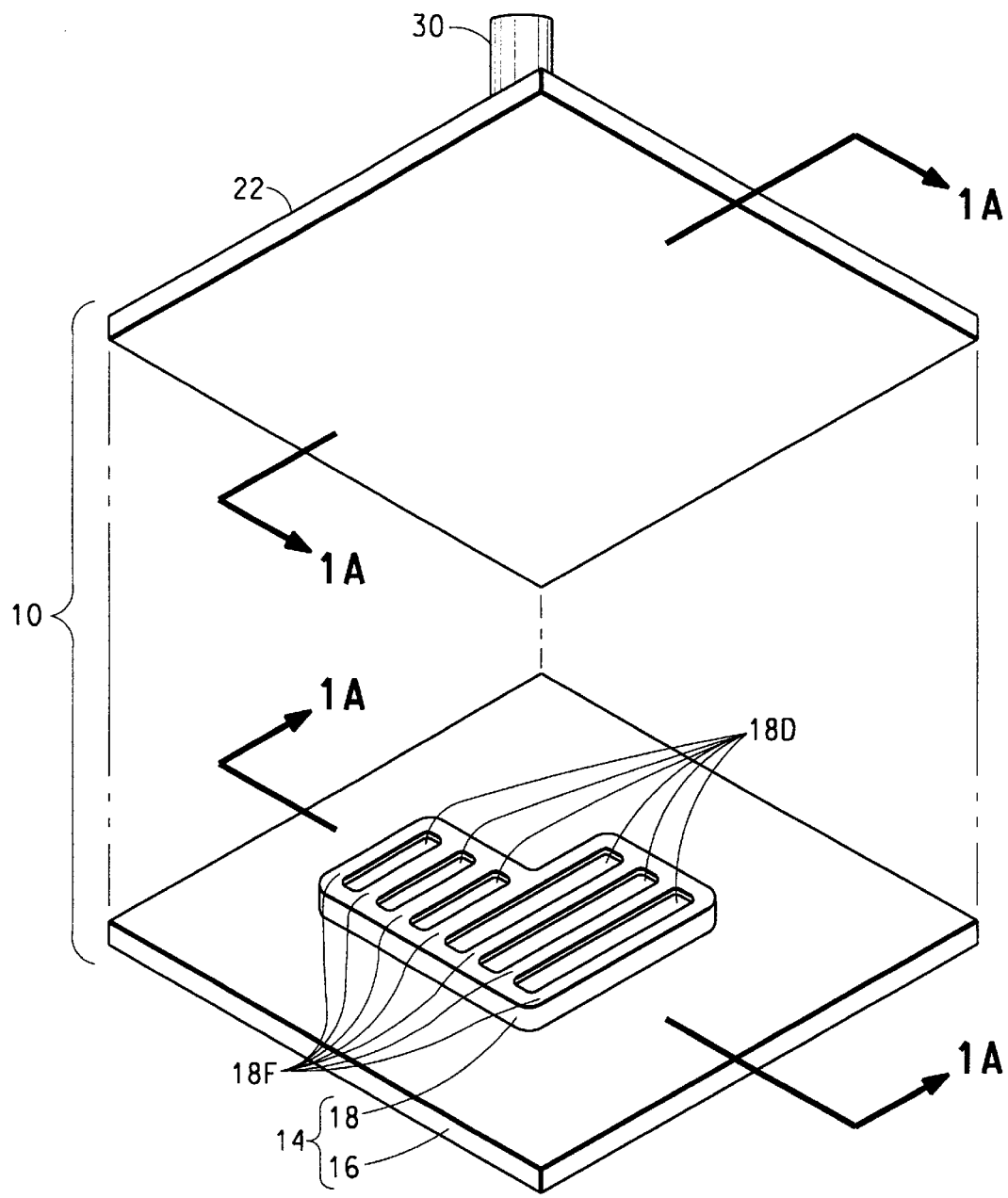
FIG. 1B is a tilted (in clam-shell fashion) perspective view (with the materials to be bonded not shown for clarity of illustration) of the bonding apparatus of FIG. 1A.

Throughout the following detailed description, similar reference numerals refer to similar elements in all Figures of the drawings. It should be understood that although the invention is described in terms of the bonding of a thermoplastic pad to the surface of a nylon pile carpet, the invention is generally applicable to the bonding a first thermoplastic member to a second thermoplastic member.

Figure 3A:
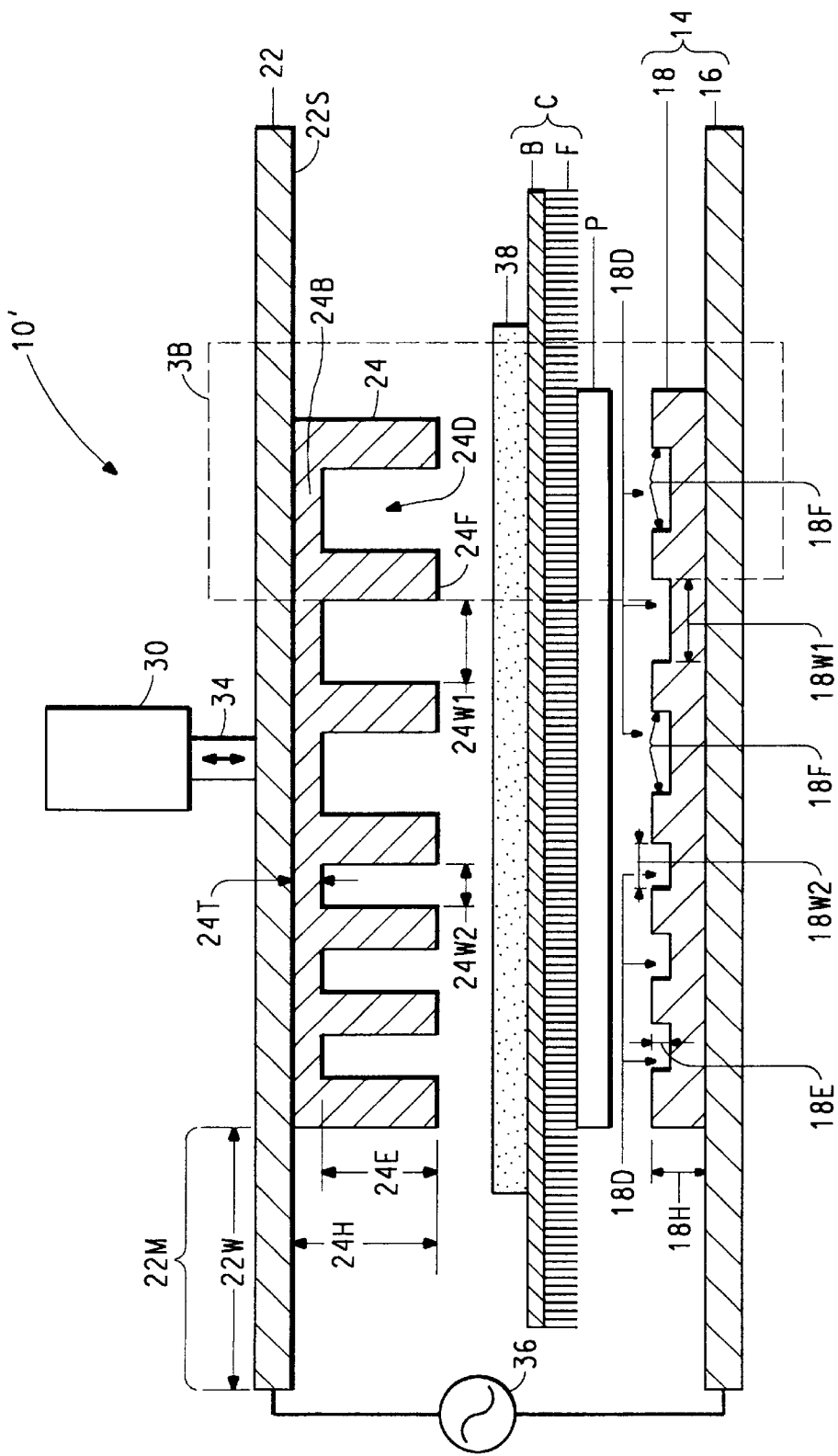
FIG. 3A is side-elevational view in section of a bonding apparatus in accordance with the present invention.
Figure 3B:
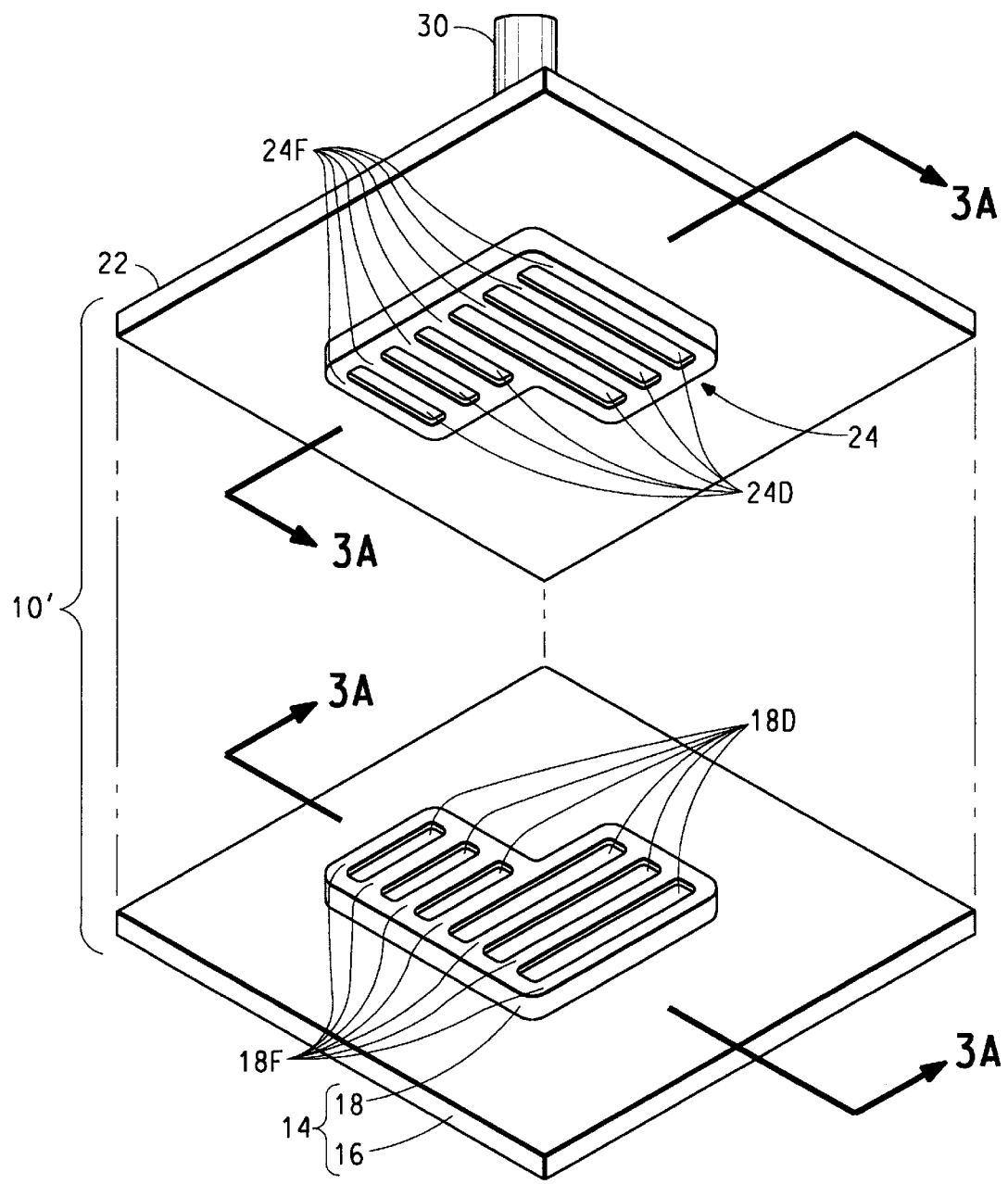
FIG. 3B is a tilted (in clam-shell fashion) perspective view of the bonding apparatus of FIG. 3A with the electrodes exposed to show the corresponding relief features on the surfaces of the die electrode and the bonding member.

FIGS. 3A and 3B illustrate a bonding apparatus 10' in which thermal runaway is minimized by reducing the localized concentration of field intensity between the coupled electrodes. In accordance with the present invention a conjugate bonding member 24 is mounted in electrically conductive contact with the backing electrode 22. As is the case with both the die electrode 14 and the backing electrode 22, the conjugate member 24 is fabricated from an electrically conductive material, such as metal or a conductive composite.

The conjugate bonding member 24 has a peripheral shape that corresponds to the peripheral shape of the die member 18. The conjugate bonding member 24 has an overall height dimension 24H associated therewith. A relief feature 24F is located on the conjugate bonding member 24 and sized to correspond to the location and size of each relief feature 18F on the die member 18. Thus, each edge formed on the conjugate bonding member 24, whether it is a peripheral edge or an edge on a relief feature, corresponds to an edge provided on the die member 18.

The conjugate bonding member 24 is preferably fabricated or assembled in a manner such that the time required to mount the conjugate bonding member 24 to the backing electrode 22 in the press 26 is minimized. Preferably, this is accomplished by forming the conjugate bonding member 24 as an integral member from a single piece of electrically conductive material. When so formed the conjugate bonding member 24 includes a base portion 24B of nominal thickness 24T from which relief features 24F extend. Alternatively, the conjugate member 24 may also be assembled into a unitized structure from individual modular pieces which are attached (as by suitable fasteners) to a base or directly to the surface of the backing electrode 22.

If desired, the conjugate bonding member 24 (however configured) may be spaced from the backing electrode 22 using any convenient form of electrically conductive stand-offs (not shown).

However formed, each relief feature 24F is defined on the conjugate bonding member 24 by depressions 24D which are located as mirror images of the depressions 18D on the die member 18. Each depression 24D has a predetermined width dimension determined in accordance with the width of the corresponding depression 18D on the die member 18. Preferably, the width dimension of the depressions 24D (and, thus, the width of the relief feature 24F defined thereby) are substantially equal to the width dimension of the corresponding depression 18D (and, thus, the width of the relief feature 18F defined thereby). By substantially equal it is meant that the widths may vary up to about ten (10) percent.

The width dimensions of the depression 24D can vary across the breadth of the conjugate bonding member 24. Thus, as is seen from FIG. 3A, the width dimensions 24W1 and 24W2 on the conjugate bonding member 24 vary in accordance with the width dimensions 18W1 and 18W2 on the die member 18.

Each depression 24D has a depth dimension indicated by the reference character 24E. The operative face of each relief feature 24F is thus disposed at least the predetermined distance 24E above the surface of the base portion 24B of the conjugate bonding member 24. Owing to the thickness dimension 24T of the base 24B such an arrangement places the peripheral edge of backing electrode 22 a distance 24H (equal to the distance 24E plus the thickness 24T) from the surface of the backing electrode 22.

The conjugate bonding member 24 is mounted on the backing electrode 22 so as to define a surrounding margin 22M. In a typical bonding press 26 the backing electrode 22 is sized to correspond to the size of the carpet being bonded. Accordingly, the margin 22M has a width dimension 22W which is greater than the sum of the height dimension (18H) of the die member (18) and the height dimension (24H) of the conjugate bonding member (24).

It has been found that concentrations of electric field intensity in the vicinity of the peripheral edges of the die electrode 18 and along the edges of relief features on the die electrode 18 may be minimized if the height dimensions of the die member and the conjugate bonding member and the depth dimensions of the relief features thereon exceed certain minimum distance requirements.

In accordance with the present invention the die member 18 should preferably have a height dimension 18H greater than about one (1) centimeter, while the conjugate bonding member 24 should preferably have a height dimension 24H greater than about two (2) centimeters. In addition, the sum of the height dimension (18H) of the die member (18) and the height dimension (24H) of the conjugate bonding member (24) should preferably be at least about three (3) centimeters.

It has been also been found that the depth dimension 24E of the depressions in the conjugate bonding member 24 should be at least about two (2) centimeters. The ratio of the second depth dimension (24E) to the first depth dimension (18E) should be at least five to one. More preferably, the ratio should be at least an order of magnitude (i.e., approximately ten to one).

So long as these minimum distance requirements are met, concentrations of electric field intensity in the vicinity of the peripheral edges of the die electrode 18 and along the edges of relief features on the die electrode 18 are minimized. This is illustrated by reference to FIGS. 3C and 4.

Figure 1C:
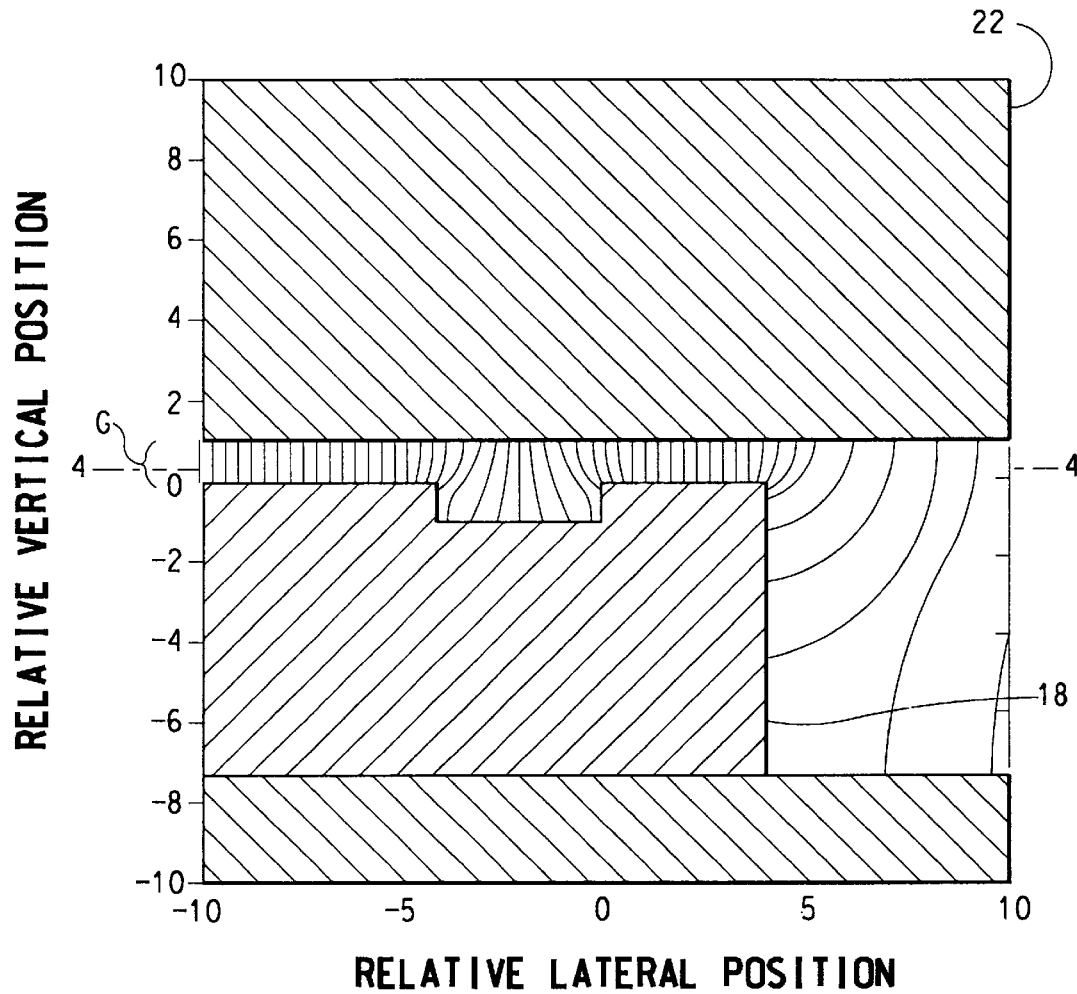
FIG. 1C is a schematic view showing the portion of the bonding apparatus of FIG. 1A enclosed by the labeled dashed box and illustrating the electric field lines between the die electrode and backing electrode therein.
Figure 2A:
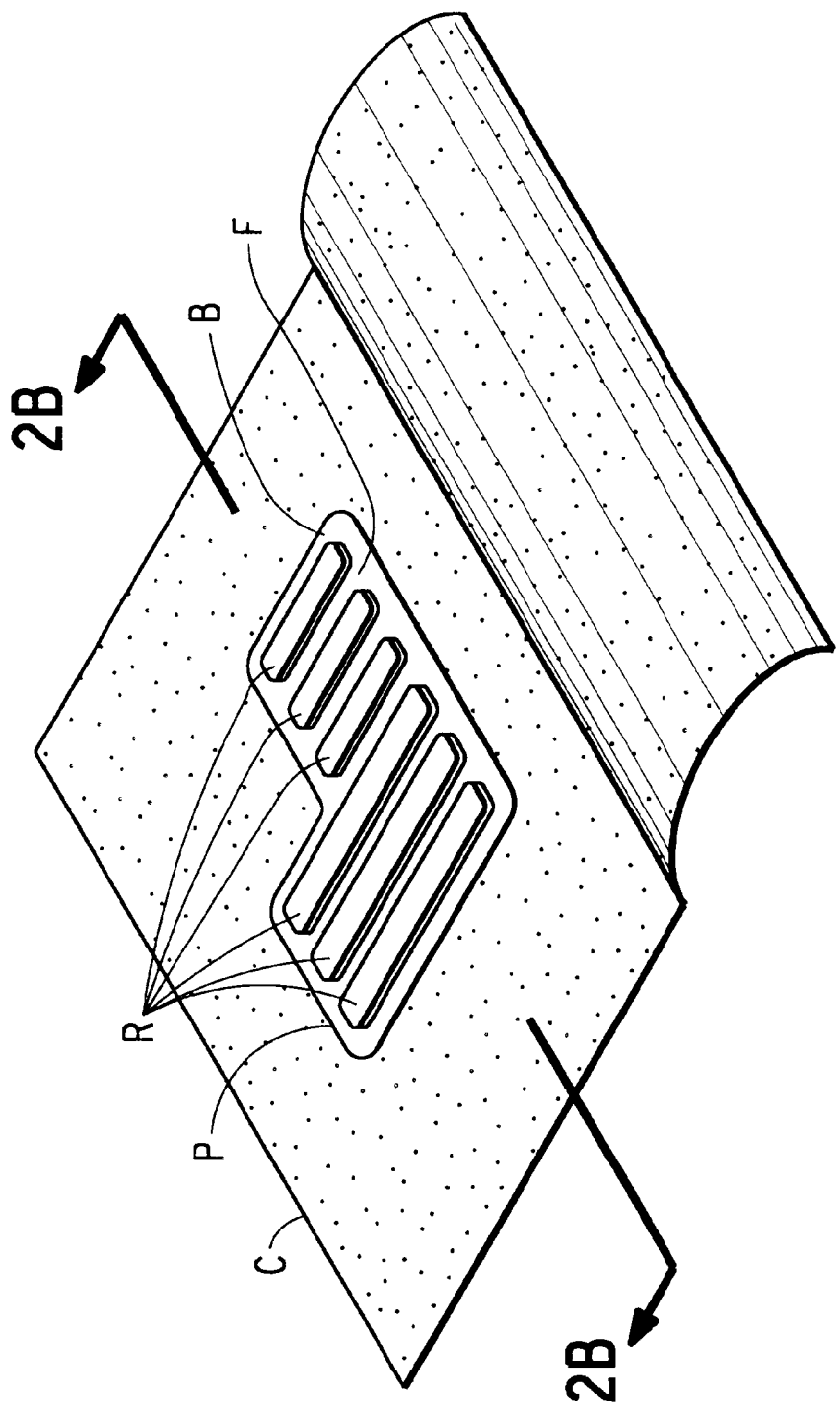
Figure 3C:
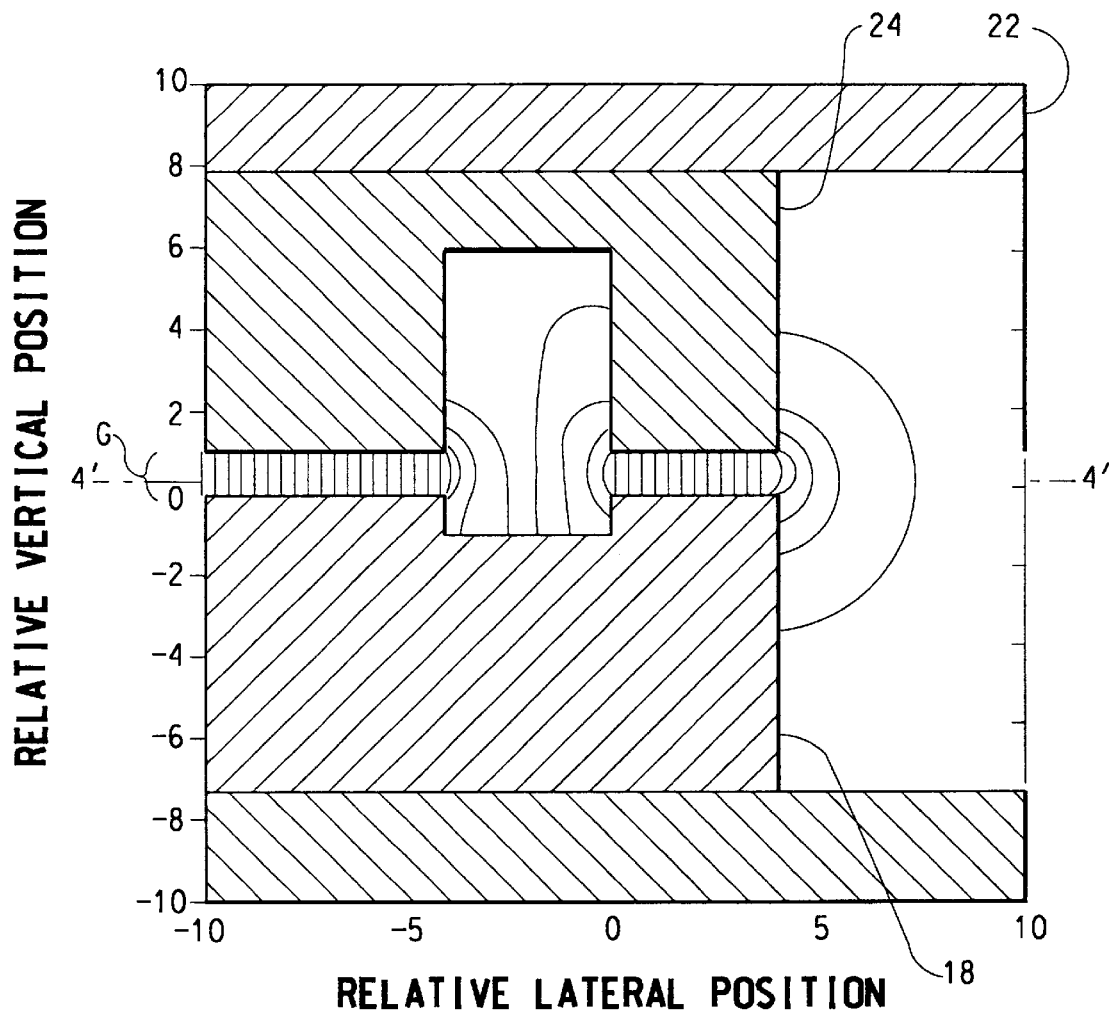
FIG. 3C is a schematic view showing the portion of the bonding apparatus of FIG. 3A enclosed by the labeled dashed box and illustrating the electric field lines between the die electrode and the conjugate bonding member on the backing electrode therein.

FIG. 3C is similar to FIG. 1C and illustrates the electric field lines (again shown as fine lines) between the die electrode and conjugate bonding member 24 on the backing electrode 22 in the portion of FIG. 3A enclosed by the dashed box. Again, for clarity of illustration, the materials to be bonded that lie within the gap G are not shown. The peripheral edges and the relief feature edges of the die electrode 18, together with the corresponding edges on the conjugate bonding member 24, produce an electric field pattern in which field lines tend to converge in the vicinity of edges to a lesser extent than is the case in FIG. 1C.

Figure 4:
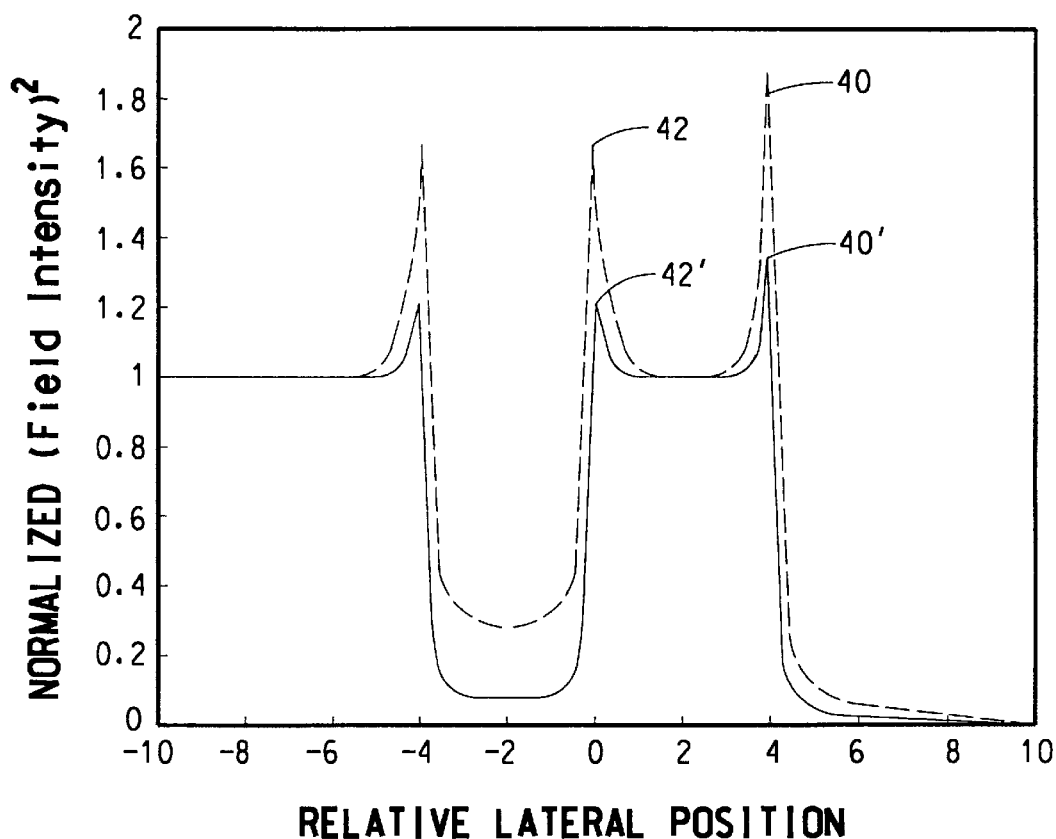
FIG. 4 is a plot showing a comparison of the square of the electric field intensities graphically illustrated in FIG. 1C (the prior art) and of the square of the electric field intensities graphically illustrated in FIG. 3C for the apparatus of the present invention, the plots being normalized to the field intensity between the central region of a relief feature 18F and the backing electrode 22.

A qualitative plot of the electric field intensities illustrated in FIG. 3C is indicated on FIG. 4 by the solid line labeled "Conjugate Electrode". The plot is taken along a reference line 4'—4' that lies a distance equal to ten percent of the width G of the gap between the die electrode 18 and the conjugate bonding member 24. The peak in the square of the field intensity associated with a peripheral edge of the die electrode is indicated at reference character 40' in FIG. 4 while the peak in the square of the field intensity associated with a relief feature edge of the die electrode is indicated at reference character 42'. The peaks 40', 42' are given at the same relative lateral positions as the peaks 40, 42, respectively.

The diminution of field intensity concentration resulting from the apparatus of the present invention may be appreciated by comparing the magnitudes of the peaks 40, 40' (which correspond to a peripheral edge on the die electrode) and the magnitudes of the peaks 42, 42' (which correspond to an edge of a relief feature on the die electrode). It may be readily seen in each case that the concentration of field intensity is reduced in a bonding apparatus 10' having a conjugate bonding member 24 in accordance with the present invention.

Figure 5:
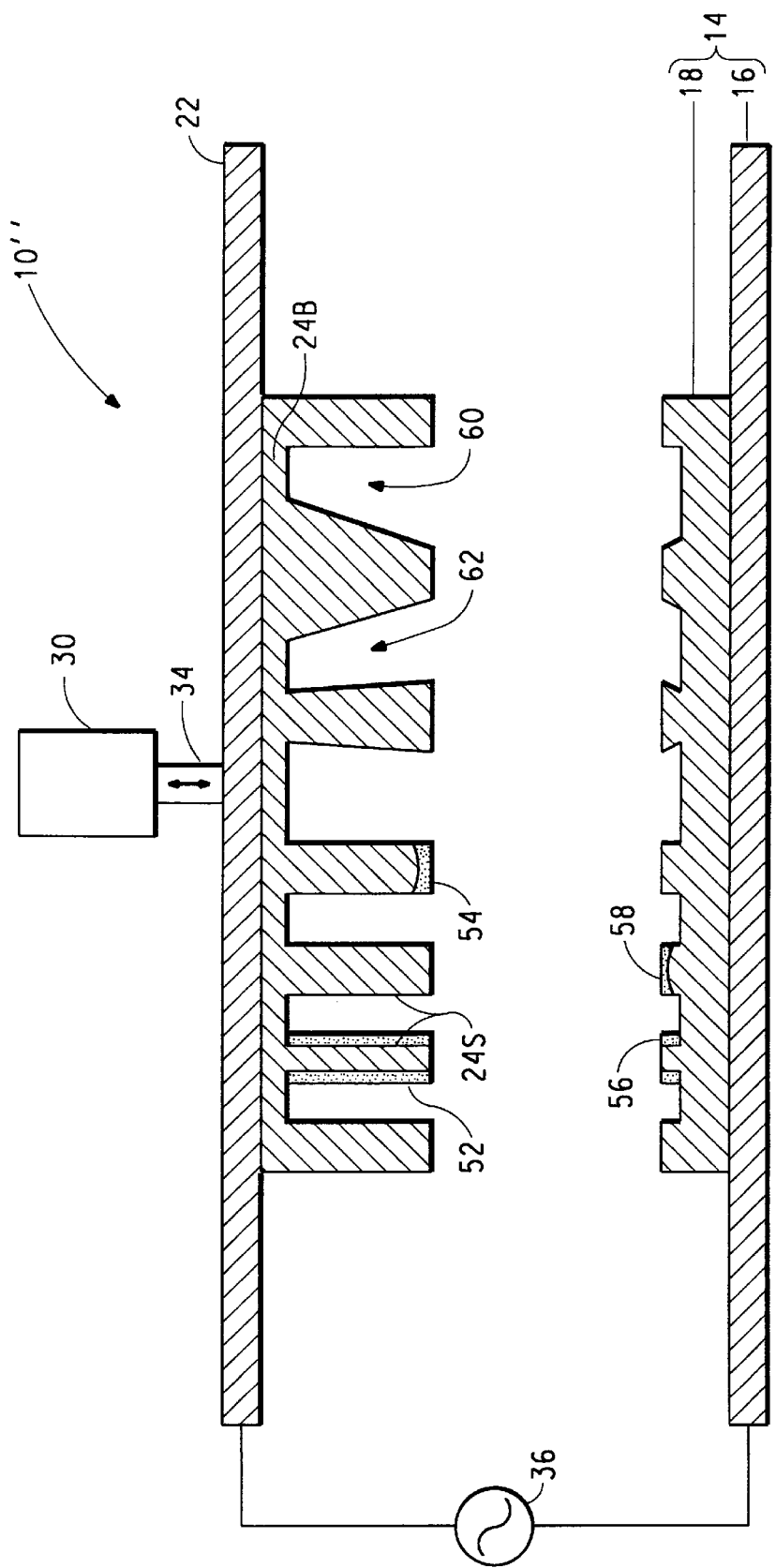
FIG. 5 is a side-elevational view, in section, illustrating further various alternative modifications to a bonding apparatus in accordance with the present invention.

The concentration of field intensity adjacent the edges may be further diminished by utilizing the further modifications illustrated in FIG. 5. In one alternative arrangement a sleeve 52 is disposed about the side 24S of a relief feature 24F. The sleeve 52 is formed from a rigid electrically nonconductive material having a low RF susceptibility, such as quartz, glass, or a low loss composite material. In another alternative arrangement a crown 54 is disposed over the operative surface of a relief feature 24F. The crown 54 is likewise formed from a rigid electrically nonconductive material having a low RF susceptibility, such as quartz, glass, or a low loss composite material. Consistent with the pattern being imparted to the pad, a sleeve 56 or a crown 58 may be provided to relief features 18F on the die member 18.

It should be appreciated from the foregoing that the bonding apparatus of the present invention permits a first thermoplastic member to be fully bonded to a second thermoplastic member without the occurrence of localized overheating or discoloration. Even if the materials to be bonded do not exhibit a temperature-dependent RF susceptibility characteristic, use of a bonding apparatus in accordance with the present invention permits bonding to occur with higher applied RF voltages and shorter bonding cycle times.

Furthermore, as shown in FIG. 5, the walls defining the depressions 24D may be inclined or curved inwardly or outwardly from the vertical orientation so as to define a relief feature that is broader (i.e., flaring) or narrower (i.e., undercut) adjacent to the base portion 24B. These alternatives are generally indicated at reference characters 60 and 62 in FIG. 5. The periphery of the conjugate member may have similar alternative configurations, if desired. Consistent with the pattern being imparted to the pad, similar modifications may be effected to the walls defining the depressions 18D on the die electrode 18.

Those skilled in the art, having the benefit of the teachings of the present invention as set forth herein, may effect numerous modifications thereto. Such modifications are to be construed as lying within the contemplation of the present invention, as defined by the appended claims.

What is claimed is:

1. In a bonding apparatus using radio frequency energy for bonding a first thermoplastic member having a predetermined peripheral shape to a second thermoplastic member thereby to form an embossed pattern having a peripheral border region (B) surrounding a plurality of raised areas (R) with flat regions (F) therebetween, the thermoplastic members being fabricated of materials which absorb radio frequency energy, the material of at least one member being susceptible to thermal runaway, the bonding apparatus including a first, die, electrode (14) and a second, backing, electrode (22), the die electrode (14) comprising a planar mounting portion (16) and a die member (18), the die member (18) having a peripheral shape with edges and relief features each with an operative face (18F) thereon, the die member (18) having a height dimension (18H), the operative face (18F) of the relief feature having a first depth dimension (18E), the peripheral shape of the die member (18) corresponding to the peripheral shape of the first thermoplastic member, while the relief features correspond to the peripheral border region (B) and the flat regions (F) of the embossed pattern, the backing electrode (22) having a planar surface (22S) thereon, the improvement comprising:

a conjugate bonding member (24) mounted to the backing electrode (22), a portion of the surface (22S) of the backing electrode (22) defining a margin (22M) surrounding the conjugate bonding member (24), the margin (22M) having a predetermined width dimension (22W), the conjugate bonding member (24) having a peripheral shape that corresponds to the peripheral shape of the die member (18), the conjugate bonding member (24) having relief features (24F) sized and located to correspond to the size and location of each relief feature (18F) on the die member (18), the conjugate bonding member (24) having a height dimension (24H), the relief feature (24F) on the conjugate bonding member (24) having a second depth dimension (24E), wherein the sum of the height dimension (18H) of the die member (18) and the height dimension (24H) of the conjugate bonding member (24) being at least three (3) centimeters, and the ratio of the second depth dimension (24E) to the first depth dimension (18E) is at least eight to one, whereby, the concentration of the electric field in the vicinity of an edge of the die member (18) is minimized and the concentration of the electric field in the vicinity of confronting edges of respective relief features on the die electrode and the conjugate bonding member is minimized, so that a first thermoplastic member is fully bonded to a second thermoplastic member in the peripheral border region (B) and the flat regions (F) without the occurrence of overheating of either thermoplastic member.

2. The bonding apparatus of claim 1 wherein the ratio of the second depth dimension (24E) to the first depth dimension (18E) is at least about ten to one.

3. The bonding apparatus of claim 1 wherein the height dimension (18H) of the die member (18) is at least about one (1) centimeter, and wherein the height dimension (24H) of the conjugate bonding member (24) is at least about two (2) centimeters.

4. The bonding apparatus of claim 1 wherein the width dimension (22W) of the margin (22M) of the backing electrode (22) is greater than the sum of the height dimension (18H) of the die member (18) and the height dimension (24H) of the conjugate bonding member (24).

5. The bonding apparatus of claim 1 wherein each relief feature (24F) on the conjugate bonding member (24) has an operative face thereon, the operative face of each relief feature (24F) on the conjugate bonding member (24) extends at least about two (2) centimeters above the surface of the backing electrode (22).

6. The bonding apparatus of claim 1 wherein each relief feature (24F) on the conjugate bonding member (24) has an operative face thereon, the bonding apparatus further comprising a crown (54) disposed on the operative face of at least one relief feature (24F) on the conjugate bonding member (24), the crown (54) being formed from a nonconductive material having a low radio frequency susceptibility.

7. The bonding apparatus of claim 1 wherein each relief feature (24F) on the conjugate bonding member (24) has a side (24S) thereon, the bonding apparatus further comprising a sleeve (52) disposed about the side (24S) of at least one relief feature (24F) on the conjugate bonding member (24), each sleeve (52) being formed from a nonconductive material having a low radio frequency susceptibility.

8. In a bonding apparatus using radio frequency energy for bonding a thermoplastic pad having a predetermined peripheral shape to a pile surface of a carpet made of a thermoplastic polymeric material susceptible to thermal runaway, thereby to emboss into the pad a pattern having a peripheral border region (B) surrounding a plurality of raised areas (R) with flat regions (F) therebetween, the bonding apparatus including a first, die, electrode (14) and a second, backing, electrode (22), the die electrode (14) comprising a planar mounting portion (16) and a die member (18), the die member (18) having a peripheral shape with edges and relief features each with an operative face (18F) thereon, the die member (18) having a height dimension (18H), the operative face (18F) of the relief feature having a first depth dimension (18E), the peripheral shape of the die member (18) corresponding to the peripheral shape of the thermoplastic pad, while the relief features correspond to the peripheral border region (B) and the flat regions (F) of the embossed pattern, the backing electrode (22) having a planar surface (22S) thereon, the improvement comprising:

a conjugate bonding member (24) mounted to the backing electrode (22), a portion of the surface (22S) of the backing electrode (22) defining a margin (22M) surrounding the conjugate bonding member (24), the margin (22M) having a predetermined width dimension (22W), the conjugate bonding member (24) having a peripheral shape that corresponds to the peripheral shape of the die member (18), the conjugate bonding member (24) having relief features (24F) sized and located to correspond to the size and location of each relief feature (18F) on the die member (18), the conjugate bonding member (24) having a height dimension (24H), the relief feature (24F) on the conjugate bonding member (24) having a second depth dimension (24E), wherein the sum of the height dimension (18H) of the die member (18) and the height dimension (24H) of the conjugate bonding member (24) being at least three (3) centimeters, and the ratio of the second depth dimension (24E) to the first depth dimension (18E) is at least eight to one, whereby, the concentration of the electric field in the vicinity of an edge of the die member (18) is minimized and the concentration of the electric field in the vicinity of confronting edges of respective relief features on the die electrode and the conjugate bonding member is minimized, so that a pad is fully bonded to a carpet in the peripheral border region (B) and the flat regions (F) without the occurrence of overheating of either the pad or the carpet pile.

9. The bonding apparatus of claim 8 wherein the ratio of the second depth dimension (24E) to the first depth dimension (18E) is at least about ten to one.

10. The bonding apparatus of claim 8 wherein the height dimension (18H) of the die member (18) is at least about one (1) centimeter, and wherein the height dimension (24H) of the conjugate bonding member (24) is at least about two (2) centimeters.

11. The bonding apparatus of claim 8 wherein the width dimension (22W) of the margin (22M) of the backing electrode (22) is greater than the sum of the height dimension (18H) of the die member (18) and the height dimension (24H) of the conjugate bonding member (24).

12. The bonding apparatus of claim 8 wherein each relief feature (24F) on the conjugate bonding member (24) has an operative face thereon, the operative face of each relief feature (24F) on the conjugate bonding member (24) extends at least about two (2) centimeters above the surface of the backing electrode (22).

13. The bonding apparatus of claim 8 wherein each relief feature (24F) on the conjugate bonding member (24) has an operative face thereon, the bonding apparatus further comprising a crown (54) disposed on the operative face of at least one relief feature (24F) on the conjugate bonding member (24), the crown (54) being formed from a nonconductive material having a low radio frequency susceptibility.

14. The bonding apparatus of claim 8 wherein each relief feature (24F) on the conjugate bonding member (24) has a side (24S) thereon, the bonding apparatus further comprising a sleeve (52) disposed about the side (24S) of at least one relief feature (24F) on the conjugate bonding member (24), each sleeve (52) being formed from a nonconductive material having a low radio frequency susceptibility.

* * * * *